H. BRAMMER.
DRIVING AND OTHER BELT.
APPLICATION FILED JAN. 31, 1921.
1,382,888.
Patented June 28, 1921.
2 SHEETS—SHEET 1.
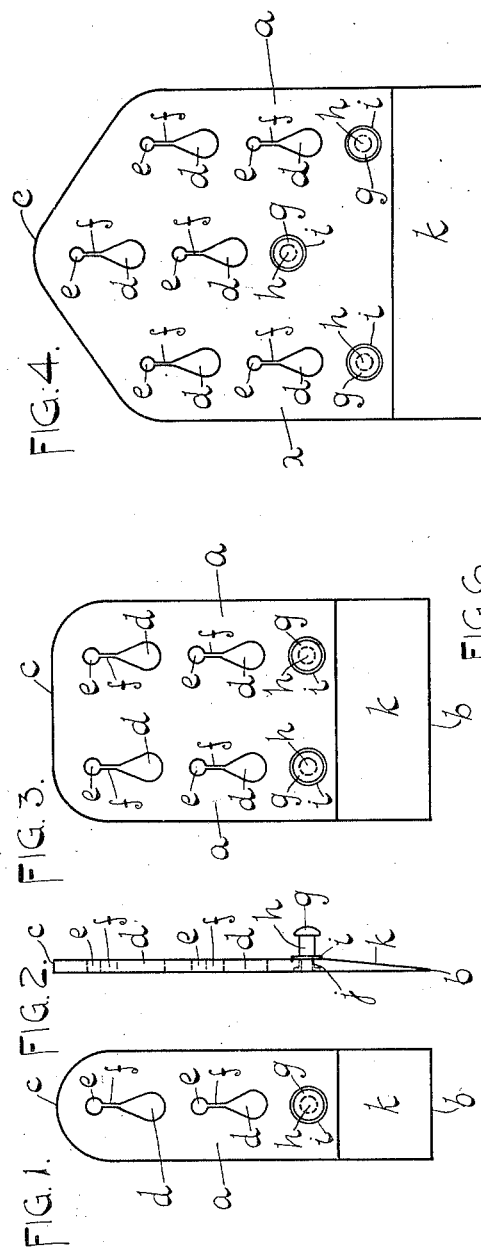
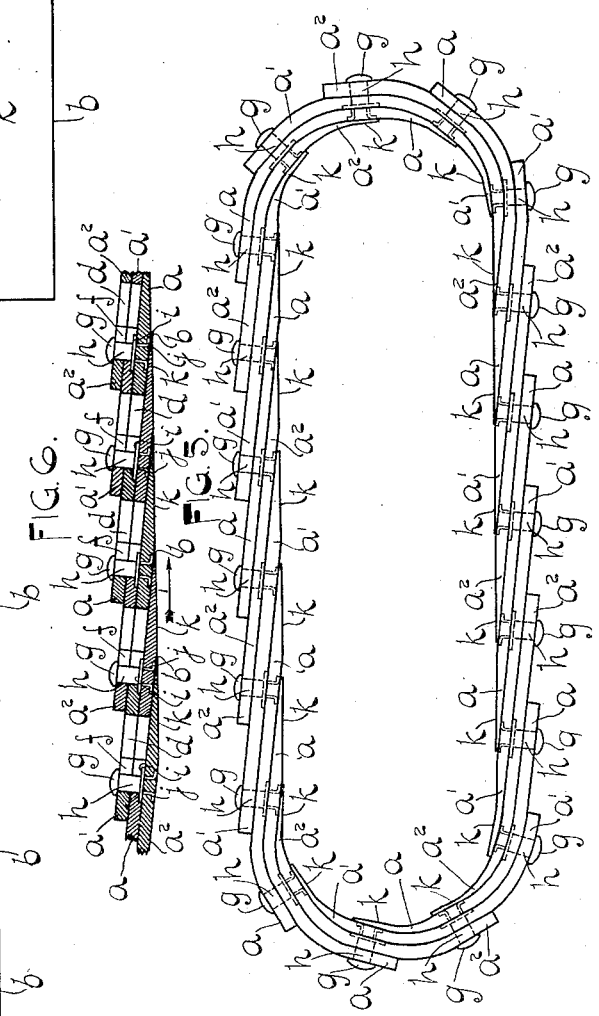
Inventor
Harry Brammer H. BRAMMER.
DRIVING AND OTHER BELT.
APPLICATION FILED JAN. 31, 1921.
1,382,888.
Patented June 28, 1921.
2 SHEETS—SHEET 2.
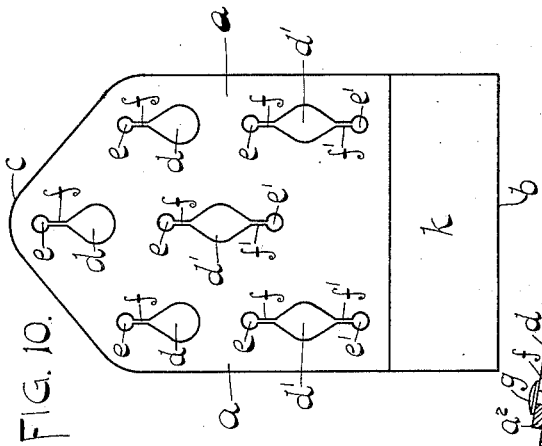
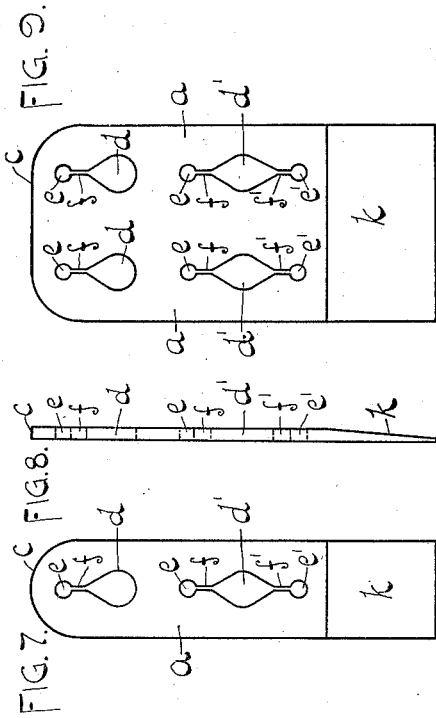
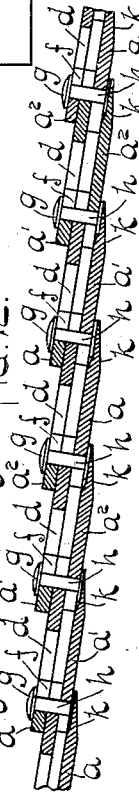
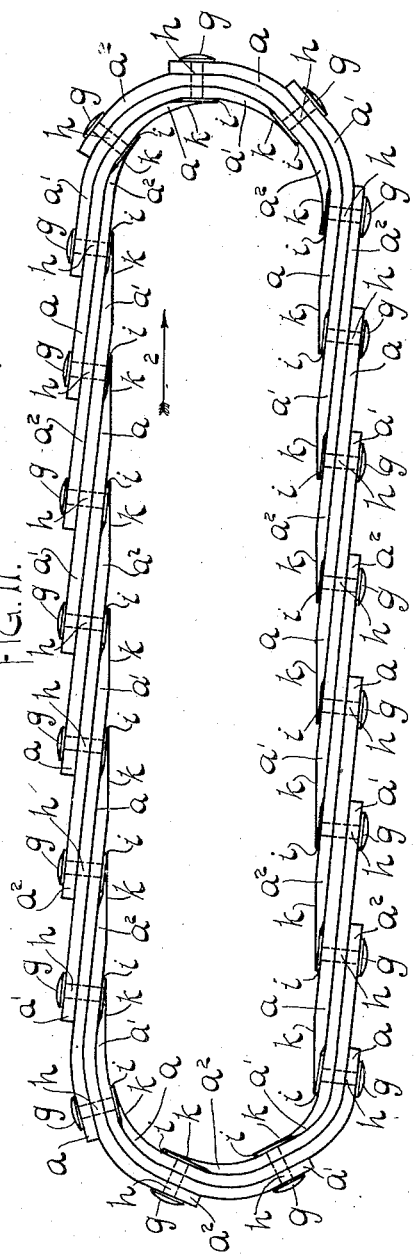

UNITED STATES PATENT OFFICE.

HARRY BRAMMER, OF LEEDS, ENGLAND.

DRIVING AND OTHER BELTS.

1,382,888. Specification of Letters Patent. Patented June 28, 1921.

Application filed January 31, 1921. Serial No. 441,382.

*To all whom it may concern:*

Be it known that I, HARRY BRAMMER, residing at 51 Woodside avenue, Burley, Leeds, in the county of York, England, have invented new and useful Improvements in or Relating to Driving and other Belts, for which I have filed application in Great Britain and Ireland, Aug. 30, 1919, Serial No. 21,336, of which the following is a specification.

This invention relates to improvements in driving and other belts which are formed of separate pieces of leather or like material,— and which, for the convenience of description, though they are not threaded or linked together, are hereinafter called "links,"— suitably secured together.

Hitherto it has been proposed to make four or more ply driving belts arranged one upon the other in step formation of a series of flexible longitudinally tapering,—or parallel,—short pieces or strips of leather or other material, the wider ends forming the outer face of the belt and the inner ends are beveled to form a continuous inner belt face, said pieces or strips being secured together by rivets, each rivet securing the whole of the plies together, or each rivet securing the end of a piece to a pair of adjacent pieces or strips, the free end of each piece or strip overlapping the head of the adjacent rivet.

The object of this invention is to produce a strong and efficient driving or other belt of any desired length and width from a number of detachable pieces or links of leather or other material laid flat one upon the other so that their ends overlap, and which do not require a special fastening device other than a headed attaching pin or stud to secure the ends of the belts together.

According to this invention the pieces of leather which form "the link" are formed or cut from small or waste pieces, or from strips or other pieces. The pieces or links may be of any required length, width and thickness. One end of each link is cut at or about a right angle to its parallel sides, and hereinafter termed "the plain end of the link." The opposite end of the link is suitably shaped, such as, say, pointed, or semi-circular, or the corners are rounded off. In each detachable link are formed a number of holes arranged in one or more parallel rows at suitable distances apart and from the ends of the link, for the insertion of studs as hereinafter described. When more than two rows of said holes are employed then the holes in each alternate row are arranged to be about midway between the holes in the preceding and succeeding rows for equalizing the strain of, or drag upon, the belt when in use. The said holes in each row are of a special shape or construction, that is to say, each hole consists of a larger and one or two smaller holes united together by a neck or slit so as to give it, say, when a large and a small hole and a neck are employed, a balloon shaped appearance, the larger portion of each hole being of such a diameter that it will permit the head or flange of the attaching stud to pass freely through it, while the smaller sized portion is employed for receiving and housing the shank or stem of the stud after it has passed through the neck or slit of the hole.

In the drawings hereunto annexed are shown methods of carrying this invention into practice, in which—

Figure 1 is an elevation of a narrow detachable link having two balloon shaped holes formed therein and an attaching stud;

Fig. 2 an end elevation of the same;

Fig. 3 is a front elevation having a detachable link with two rows of holes and two attaching studs fixed to the link;

Fig. 4 is a front elevation of a detachable link having three rows of holes formed therein and three attaching studs fixed thereto;

Fig. 5 is an elevation of a belt formed of a number of detachable links shown at Figs. 1 to 4 with the ends united together;

Fig. 6 is a part sectional elevation of the belt shown at Fig. 5;

Fig. 7 is a front elevation of a detachable link with two holes formed therein, one balloon shaped and one with a second small hole and neck;

Fig. 8 is a side elevation of Fig. 7;

Fig. 9 is a front elevation with two rows of similar holes to those shown at Fig. 7;

Fig. 10 is a front elevation of a detachable link with three rows of holes similar to those shown at Fig. 7;

At Figs. 7 to 10 the fixed attaching studs are dispensed with and loose studs are employed in place thereof.

Fig. 11 is an elevation of a belt constructed of detachable links formed as shown at Figs. 7 to 10;

Fig. 12 is a part sectional elevation of the belt shown at Fig. 11.

Like parts in all the views are marked with similar letters of reference.

$a$ is the detachable link which may be of any suitable length, width and thickness, and it may be formed from either waste pieces, or from pieces or strips of leather or like material. One end $b$,—which is chamfered as shown at Figs. 2 and 8,—is cut at or about a right angle to its parallel sides, and hereinafter termed "the plain end of the link." The opposite end $c$ is suitably shaped, as, for example, say, semi-circular, as shown at Figs. 1 and 7; or with the corners rounded off, as shown at Figs. 3 and 9; or in the pointed form, as shown at Figs. 4 and 10. In each detachable link are also formed a number of holes $d$ (and $d^1$, Figs. 7 to 10) in one or more parallel rows and at suitable distances apart. At Figs. 1 and 7 a single row is shown; at Figs. 3 and 9 a double row is shown; and at Figs. 4 and 10 three rows are shown. The said row or rows of holes is or are arranged at a suitable distance or distances from each of the ends of the link. When more than two rows of holes are employed, then the holes in each alternate row are arranged,—as at Figs. 4 and 10,—to be about midway between the holes in the preceding and succeeding rows for equalizing the strain of, or drag upon, the belt, when in use. The holes in each of the said rows are of a special shape or construction. That is to say each hole consists of a larger portion $d$ (and $d^1$) and one or more smaller portions $e$ and $e^1$ united together by a neck or slit $f$ (and $f^1$ Figs. 7 to 10). At Figs. 1 to 4 the holes in each row are of the same shape, namely, they have a somewhat balloon shaped appearance, but at Figs. 7 to 10 the second row of holes are rather differently shaped, namely, the holes $d^1$ instead of being circular are elongated and united by a second neck $f^1$ to a second circular hole $e^1$. The larger portion $d$ (and $d^1$) of each hole is of such a diameter that it will permit of the head of a stud $g$ passing freely through it while the smaller sized portion $e$, or $e^1$, is employed for receiving and housing the shank or stem $h$ of the stud $g$ after it has passed through the neck or slit $f$ or $f^1$. Each row of balloon shaped holes consists of two or more of such holes arranged in a longitudinal line or lines at suitable distances apart. The end of each row of holes is, as previously named, at a suitable and varying distance apart from each of the ends of the link. That is to say the holes are nearer the curved or pointed end $c$ than the plain end $b$. As a rule for comparatively narrow belts two rows of holes will be formed in each link, but for wide and strong belts it may be necessary to use more than two of such rows of holes in a link.

The headed metal attaching stud $g$ is provided with a flange $i$ which is fixed to its shank,—as shown at Figs. 2 and 6,—and below the shank is formed a tubular portion $j$ which is employed for attaching it to the link as shown, the outer ends of the tubular portion being turned at a right angle to its main portion in eyelet fashion.

In some cases, and in place of the tubular portion $j$, prongs similar to those of a bifurcated rivet are employed and the outer ends of the said prongs are arranged to turn at a right angle in a similar manner to the outer ends of the said tubular portion. At Figs. 7 to 12 where loose rivets are employed the tubular or bifurcated portion $j$ of the stud is dispensed with, and the flange $i$ is then employed in conjunction with the head $g$ for connecting the three links together, as shown at Figs. 11 and 12. One, two, or three headed and flanged metal studs $g$ for belts constructed as shown at Figs. 1 to 6 is or are fixed to each link at a suitable distance from the plain end $b$ of the link, and also at a suitable distance from the lower holes $d$ in each row of holes. When there are three (or more) rows of holes in a link, then the stud $g$ in the second of the three will be about midway between the holes in the first and third rows of the link, as shown at Fig. 4. The studs $g$ are arranged to project at or about a right angle from the outer side of the link and they are secured in position by any suitable means on its inner side, as, for example, say, by the means previously described, or by riveting, and with or without the additional means of a washer on the inner side of the link. The ends $b$ of the link are chamfered or tapered,—as shown in the several figures of the drawings,—so as to permit of the link on the inner side of the belt readily adapting itself to the periphery of the pulley over which it is required to work. On reference to the drawings it will be seen at Figs. 5, 6, 11, and 12, that the chamfered portion of each link of the belt projects beyond the chamfered portion $k$, of a lower link and that the projecting chamfered portion $k$ is of such a length as to permit of the said portions covering the clenched or eyeletted, or flanged portions of the attaching stud $g$. The headed portion of each stud $g$ and the flanges $i$ are arranged to respectively lie flat on the outer and inner surfaces of the respective links that they attach together.

To form a belt of the links as shown at Figs. 1 to 4, three links marked in Figs. 5 and 6 $a$, $a^1$, $a^2$ are laid successively one upon the other, the larger portion of the second,—from the pointed or other shaped end of the link $c$,—balloon shaped hole in each row of links $a^1$ is placed over the head of the fixed stud or studs $g$ which projects or project from the lower link $a$. The head or heads of the stud or studs is or are pressed through the larger portion $d$ of the said hole or holes, and the link $a^1$ is drawn in the direction of arrow 1 for causing the stem $h$ of each stud to pass through the neck or slit portion $f$ of the hole so as to be inclosed or housed on the smaller hole $e$ for securing the link $a^1$ in position. The chamfered end $b$ of link $a^1$ will then project beyond the chamfered end $b$ of link $a$. A third link $a^2$ is then placed upon the second link $a^1$. The said link $a^2$ is then placed in a similar manner over link $a^1$ and the stud or studs in link $a$ is or are passed through the upper hole or holes in link $a^2$ and the lower hole or holes in the said link is or are passed through the stud or studs of link $a^1$ and the studs are drawn through the necks $f$ into the shall holes $e$.

The operation is continued with each row of links until a sufficient length has been formed to make a driving belt, and then the end holes in links $a$ and $a^1$ will be passed over the studs $g$ in the last two links thus enabling a belt to be formed, and its ends secured together, without the usual additional fastenings being provided.

In the case of the links, shown at Figs. 7 to 10, where loose studs are employed a stud or studs $g$ is or are then placed and passed through the lower hole or set of holes $d^1$, in, say, a first link $a$, that is, the holes nearest the chamfered end $b$ of link $a$, and drawn through the neck or necks $f^1$ into the hole of holes $e^1$. A second stud or studs is or are then passed through the larger portion of the same lower hole or set of holes $d^1$ and drawn through the neck or necks $f$ into the hole or holes $e$, that is, in an opposite direction to the first stud. The link $a$ is then ready for receiving a second link $a^2$ which is placed under the first link $a$. The lower hole or set of holes $d^1$ in the second link $a^2$ is or are then placed in position for the second stud or set of studs of link $a$ to be passed through the lower hole of link $a^2$ and drawn through the neck or necks $f^1$ into hole or holes $e^1$ of the second link. A third stud or set of studs is or are passed through the top hole or holes $d$ of the first link $a$ and the lower hole or holes $d^1$ of the second link $a^2$, Figs. 7 and 9, or the lower middle hole or set of holes of Fig. 10 in link $a^2$ and drawn through the neck or necks $f$ into hole or holes $e$. The third link $a^1$ is then placed under the link $a^2$ and the third stud or set of studs passed through the lower hole or set of holes $d^1$ of link $a^1$ and drawn through the neck or necks $f^1$ into hole or holes $e^1$. The said operations are continued until the desired length of belting has been made.

When the required length of belting has been formed as herein described its ends are united together to form an endless belt, as at Figs. 11 and 12, as follows:—

The length of belting is first bent until its ends are over each other when there will be two holes in the last link and one hole in the last but one without studs.

The top hole or set of holes $d$ in the last link, and the lower hole $d^1$ in the same link, and the top hole in the last link but one is or are passed over the two bottom studs $g$ in link $a$ in the opposite end of the belting; one end of the belting is then drawn in the direction of arrow 2, Fig. 11, for passing the shanks of the studs through necks $f$ into holes $e$.

By the said means a strong, flexible, and comparatively non-expansive driving belt is produced, and provision is made in the event of any link becoming worn or damaged for it being readily removed and another link substituted.

What I claim is:—

1. A driving belt formed of a plurality of relatively flat links arranged in overlapping relation, each link being chamfered at one end and provided with holes including a relatively enlarged body portion adapted to permit passage of a headed fastener and a reduced portion adapted to receive only the shank of such a fastener, and a plurality of headed fasteners each extending through alined holes in overlapping links and securing said links together.

2. A driving belt formed of a plurality of leather links arranged in overlapping relation, each link being chamfered at one end and having in its body a hole including a balloon-shaped portion and a relatively small hole connected with the balloon-shaped portion by a narrow neck, and a plurality of fasteners extending through alined holes in overlapping links, as set forth.

3. A driving belt formed of a plurality of relatively flat links arranged in overlapping relation, each link being suitably chamfered at one end and having a plurality of rows of holes formed therein, one of said holes in each row including a balloon shaped body connected by a neck to a smaller hole, and headed fasteners passing through said holes and connecting the links.

4. A driving belt formed of a plurality of links arranged one upon the other, each link being suitably chamfered at one end and having a plurality of rows of holes formed longitudinally of its body, one hole of each row including two small holes arranged at the extremities of and connected by necks to an enlarged central portion, another hole in each row having a body of balloon shape connected at one end to a small hole by a neck, and means passing through said holes and connecting the links.

5. A driving belt formed of a plurality of leather links, arranged in overlapping relation, each link being suitably chamfered at one end and provided with a plurality of holes arranged in longitudinal rows, one hole of each row including an enlarged central portion and necks connecting the central portion with circular holes at each extremity, other holes in the link having balloon shaped bodies each connected by a neck to a small circular hole and fasteners passing through the said holes and holding the links together, as set forth.

HARRY BRAMMER.

Witnesses:
M. W. BOTTOMLEY,
G. PARK.